Fig. 1

Oct. 31, 1967 T. M. INGMAN 3,350,631
VOLTAGE REGULATOR WITH SWITCHING MEANS INTRODUCING
VOLTAGE INCREMENTS INTO THE INPUT SIDE
Filed April 3, 1964 3 Sheets-Sheet 2

INVENTOR.
Thomas M. Ingman

Attorneys

Oct. 31, 1967

T. M. INGMAN 3,350,631

VOLTAGE REGULATOR WITH SWITCHING MEANS INTRODUCING
VOLTAGE INCREMENTS INTO THE INPUT SIDE

Filed April 3, 1964

INVENTOR:
Thomas M. Ingman

By Smyth, Roston & Pavitt
Attorneys

United States Patent Office 3,350,631
Patented Oct. 31, 1967

3,350,631
VOLTAGE REGULATOR WITH SWITCHING MEANS INTRODUCING VOLTAGE INCREMENTS INTO THE INPUT SIDE
Thomas M. Ingman, North Ridge, Calif., assignor to Microdot, Inc., South Pasadena, Calif., a corporation of California
Filed Apr. 3, 1964, Ser. No. 357,127
17 Claims. (Cl. 323—45)

ABSTRACT OF THE DISCLOSURE

This invention relates to a system for controlling the output voltage of a line by determining the variations in the output voltage from a reference voltage. The invention provides switching means which operate in a first state when the variations have a positive polarity and a particular amplitude, operate in a second state when the variations have a negative polarity and the particular amplitude and operate in a third state when such variations have less than the particular amplitude. A voltage increment of a particular magnitude is added to the input voltage in the line with the switching means in the first state; a voltage increment of the particular magnitude is subtracted from the input voltage in the line with the switching means in the second state; and a voltage increment of a magnitude less than the particular magnitude is added to or subtracted from the input voltage in the line with the switching means in the third state. Actually, a plurality of switching means may be provided to sense the relative values of the reference voltage and progressive increments of the output voltage and to introduce voltage increments to the input side of the line in accordance with the operation of such switching means.

---

The present invention relates to a system for controlling an output voltage. More particularly, the invention relates to a system for introducing a compensating voltage between an input side and an output side of a line, so that the output side of the line furnishes a controlled voltage even if the input side of the line receives a variable voltage.

Voltage controllers, voltage feed-back control apparatus, and automatic voltage control and compensating networks cover a wide field in the art. Voltage control has been attained with a large variety of components including electronic switching and amplifying elements, magnetic amplifiers, servo-controlled variable transformers, and rheostats.

In certain types of voltage control, a compensating voltage is either added to or subtracted from a voltage at the input side of a line. In certain systems of the prior art, the comensating voltage is automatically provided at the input side of a line to control the voltage at the input side of the line in accordance with variations in the voltage at the output side of the line. In some of such automatically operative systems of the prior art, the compensating voltage is not sinusoidal, but a large amount of harmonics is introduced into the line. In particular, the amount of harmonics becomes drastically increased in such systems when a relatively large compensating voltage is needed to control the voltage at the input side of the line. In other of such automatically operative systems, the compensating voltage tends to introduce phase deviation into the voltage at the input side of the line.

This invention provides a system for automatically controlling the voltage on a line and for eliminating the difficulties described in the previous paragraph. According to one aspect of the present invention in a preferred embodiment thereof, a plurality of switching means are coupled into a voltage line, with each such switching means adding or subtracting a voltage increment of low amplitude for purposes of voltage compensation. Control means are provided to establish which ones of the switching means in the plurality of switching means are to add the voltage increment of low amplitude and which ones of the switching means in the plurality of switching means are to subtract the voltage increment of low amplitude. It is a feature of the present invention that a compensating voltage required to maintain an output voltage at a desired amplitude level is subdivided into the voltage increments of low amplitude for addition or subtraction by all of the switching means except one, with the fixed amounts of voltage increments being furnished by all of such switching means in such a manner that the output voltages from such switching means are substantially sinusoidal. Only a fraction of the fixed amount of the compensating voltage is generally introduced by the remaining switching means as nonsinusoidal voltage blocks or segments of alternating polarity.

In this way, most of the switching means in the plurality provide coarse compensations in the output voltage and the remaining switching means in the plurality provides a fine control in the value of the output voltage. The particular switching means selected to provide the small fraction of compensating voltage is dependent upon the total compensation to be provided by all of the switching means. Since only one of the switching means in the plurality can introduce distortions into the output at any one time and since this switching means generally controls only a small fraction of the total compensation to be provided by all of the compensating means in the plurality, only a minor amount of distortion is introduced by the system constituting this invention, especially in comparison to the distortions introduced by the compensating systems of the prior art.

Although different types of switching means can be used in the system constituting this invention, saturable magnetic amplifiers are specifically described, each switching means in the plurality being formed from a different pair of magnetic amplifiers. Each magnetic amplifier is controlled by a direct current in its saturation or non-saturation and in its direction of saturation. The direct currents individually controlling the saturations of the magnetic amplifiers in the individual pairs are, in turn, controlled preferably by electronic stages. The several electronic stages are connected through a switching device to a common terminal which provides a voltage control having a value representing the variations of the output voltage from the desired value. The control voltage at the common terminal is progressively decreased by a series circuit formed by a plurality of control members, each having a voltage drop of a fixed amplitude, such that each of the electronic stages receives a progressive proportion of the control voltage. These progressive portions of the control voltage are compared in the electronic stages with a reference voltage to produce an error voltage for each stage in accordance with the results of the comparison. The error voltage produced for each stage controls whether the pair of magnetic amplifiers in that stage will add the voltage increment of low amplitude to the output voltage or whether the pair of magnetic amplifiers will substract the voltage increments of low amplitude from the output voltage. The operation of the particular pair of magnetic amplifiers providing only a fraction of the voltage increment of low amplitude is also controlled by the error voltage for that stage. The particular pair of magnetic amplifiers in the plurality is also selected at each instant in accordance with the value of the control voltage relative to the reference voltage at that instant.

The magnetic amplifiers in each pair are connected in a push-pull relationship to be automatically regulated by the associated electronic stage. This push-pull relationship is obtained by connecting a pair of windings in the first magnetic amplifier in the pair as a first pair of opposite legs in a bridge and by connecting a pair of windings in the second magnetic amplifier in the pair as a second pair of opposite legs in the bridge. By this connection of the windings in the magnetic amplifiers, the associated electronic stage controls the magnetic amplifiers in first, second and third states of operation. In the first state of operation, the first magnetic amplifier in the pair becomes saturated and causes the voltage increment of low amplitude to be added to the voltage at the input side of the line. In the second state of operation, the second magnetic amplifier becomes saturated and causes the voltage increment of low amplitude to be subtracted from the input side of the line. In the third state of operation, neither of the magnetic amplifiers in the pair becomes saturated so that only a fraction of the voltage increment is introduced into the line.

Even after the line voltage is regulated, such as by the system constituting this invention, to produce a desired output voltage, the output voltage can still be varied as the voltage is transferred from the regulating apparatus to the place where the voltage is used. This variation in the output voltage is especially pronounced when the voltage is transferred through a long line. The variation in the output voltage may result from the electrical resistance in the long line and also from the inductive reactance in the line. The electrical resistance of the line tends to decrease the output voltage, and the inductive reactance in the line tends to vary the phase of the output voltage from a desired value. Means are provided in the system constituting this invention for compensating for such variations. For example, a first transformer having close magnetic coupling is used to boost the amplitude of the voltage so as to compensate for decreases in the voltage as a result of the resistance in the line. A second transformer having a loose magnetic coupling is used to compensate for variations in the phase of the output voltage as a result of the inductance in the line. The output of the first and second transformers can be individually varied by the manual operation of potentiometers and then combined to provide for a compensation unique to the characteristics of the line passing the voltage to the place where the voltage will be used.

It is another feature of the present invention to provide A.C. control stages furnishing compensating voltages to be added to or subtracted from an unregulated line voltage, the amplitudes of the compensating voltages furnished by each stage being either similar or arranged on a binary scale. The coarse voltage control is carried out by fixed compensating voltages used in a digital mode of operation, and such compensating voltages are either in phase or out of phase with the unregulated line voltage. The arithmetic of adding and subtracting digitally such compensating voltages thus employs selected similar or binary-scaled units. Fine control is carried out in a single one of the stages, which is either shifted or is the stage with the lowest binary increment. Switching means are employed and are controlled separately by an error signal representing the line voltage for governing the stages furnishing the compensating voltages. The switching means determines which A.C. control stage subtracts, i.e., adds an out-of-phase voltage, and which stage adds an in-phase voltage. The switching means further determines the operational level of interpositioning the fine control stage in between the adding and subtracting stages.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawing, in which:

Figure 1:
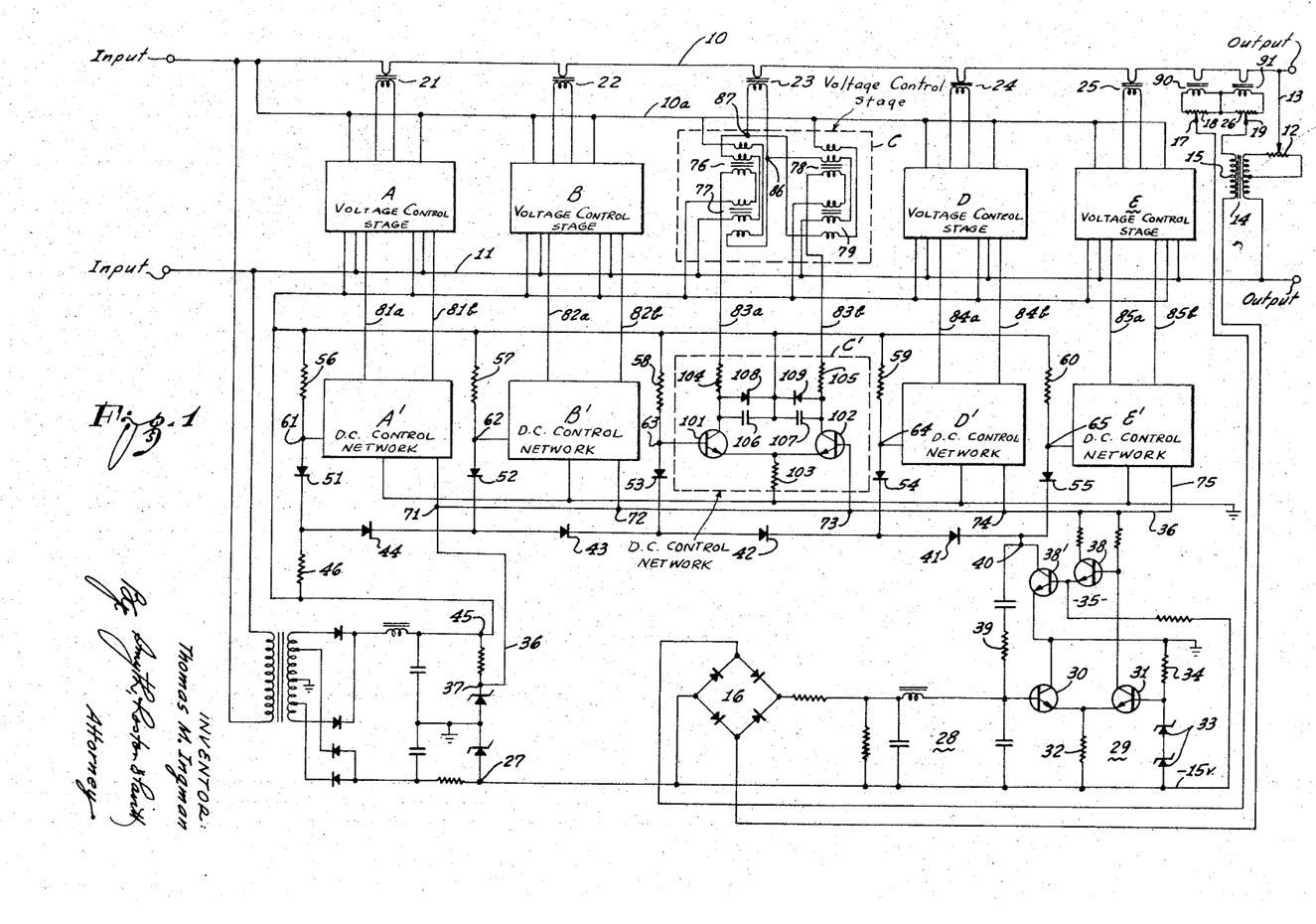
FIG. 1 illustrates a detailed wiring diagram of a preferred embodiment of the present invention.

Proceeding now to the detailed description of the wiring diagram shown in FIG. 1, there are illustrated a pair of output terminals and a pair of input terminals having the voltage regulator interconnected in between. Line 10, which is inserted between one input terminal and one output terminal, may constitute a part of a voltage-and-current supply line continued at the output terminal. Line 11 may constitute either a neutral connection line or a different phase. Voltage compensating elements are being inserted into line 10.

There are altogether five transformers 21, 22, 23, 24, and 25 having their respective low-voltage, high-current secondary windings connected in series and respectively constituting part of line 10. The primary windings of these transformers individually connect to compensating voltage control stages A, B, C, D, and E, to be described more fully below. The output voltage between lines 10 and 11 is monitored as between the output terminals thereof, and there is provided a potentiometer 12 having its adjustable tap 13 connected to the output terminal of line 10. Potentiometer 12 connects across a portion of a primary winding of a transformer 14 having one of its sides connected to the output terminal of line 11. The secondary winding 15 of transformer 14 develops a voltage which is indicative of the output voltage across the output terminals of lines 10 and 11.

One side of secondary winding 15 connects directly to one A.C. terminal of a rectifier bridge 16. The other A.C. terminal of rectifier bridge 16 is connected to the adjustable tap 17 of a potentiometer 18. The purpose and operation of potentiometer 18 will be explained more fully below. For the moment, it is sufficient to state that adjustable tap 17 can be directly connected to the adjustable tap 19 of another potentiometer 26. Adjustable tap 19 connects to the other side of secondary winding 15. Accordingly, as long as taps 17 and 19 are interconnected directly, the A.C. terminals of rectifier bridge 16 will receive the output voltage of transformer 14 as developed across secondary winding 15, so that the D.C. voltage developed by rectifier bridge 16 is directly indicative of the output voltage between lines 10 and 11.

The negative terminal of rectifier bridge 16 connects to a source 27 of fixed potential, which is negative with respect to ground. A filter network 28 connects the rectifier bridge 16 to a differential amplifier 29.

Differential amplifier 29 comprises two transistors 30 and 31 having their emitters interconnected, and they are jointly connected to terminal 27 through a biasing resistor 32. The positive filter output is connected to the base electrode of transistor 30 having its collector electrode connected to ground. The base electrode of transistor 31 is biased by two Zener diodes 33, which are also connected to negative voltage source terminal 27. Resistor 34 completes the biasing circuit for transistor 31 and connects the base electrode thereof to ground. The collector electrode of transistor 31 connects to the base electrode of a transistor 38 having its collector and base electrode resistively connected to a line 36, which is connected to a source 37 of positive voltage potential. The emitter electrode of transistor 38 is resistively connected to terminal 27 and directly to the base electrode of a transistor 38'. The emitter electrode of transistor 38' is grounded, and the collector electrode thereof is connected to the positive filter output via an RC network 39. The collector electrode of transistor 38' furthermore feeds a control signal to a terminal 40, which control signal constitutes the principal error signal.

Transistors 38 and 38' are connected to constitute an error signal amplifier 35 for amplifying the voltage developed between the two collector electrodes of transistors 30 and 31. The RC network 39 furnishes a 180° phase shift of a signal developed at output terminal 40 as compared with the filter output to prevent oscillation. Accordingly, the RC network constitutes a stabilizing feed-back circuit.

The amplifier 35, comprising the two transistors 38 and 38', is indirectly controlled by the signal developed at the base electrode of transistor 30, which signal still represents the output voltage between lines 10 and 11; and this amplifier is furthermore controlled by the constant voltage developed across Zener diodes 33 and applied to the base electrode of transistor 31. The system is adjusted so that, at the desired line voltage, the base electrodes of transistors 30 and 31 receive similar voltages.

The voltage developed at terminal 40 effectively controls five D.C. control circuit networks A', B', C', D', and E'. Between these five stages A' through E' and terminal 40, there is interposed a diode-type switching circuit (see also FIG. 3). This diode-type switching circuit comprises four diodes 41, 42, 43, and 44 connected in series and at similar orientation. The cathode of diode 41 connects directly to terminal 40, and the anode of diode 44 connects to a source of relatively high positive voltage potential 45 via a resistor 46.

Figures 3, 4:
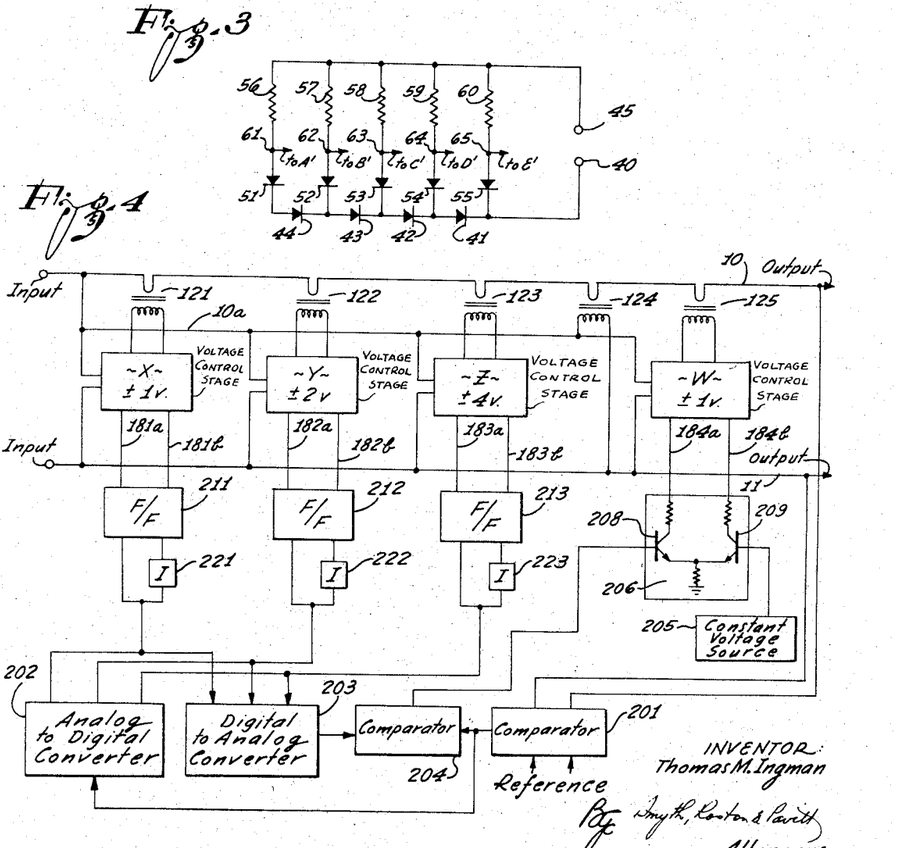
FIG. 3 illustrates a preferred diode switching device as used in the embodiment shown in FIG. 1.
FIG. 4 illustrates a block diagram of an automatic voltage control device using digital as well as analog principles.

The diode switching network further comprises five diodes 51, 52, 53, 54, and 55. These diodes 51 through 55 have their anodes respectively conected to terminals 61, 62, 63, 64, and 65, respectively, pertaining to stages A', B', C', D', and E'. The cathode of diode 51 connects to the anode of diode 44; the cathode of diode 52 connects to the junction of diodes 43 and 44; the cathode of diode 53 connects to the junction of diodes 42 and 43; the cathode of diode 54 connects to the junction of diodes 41 and 42; and the cathode of diode 55 connects to the junction of diode 41 and a terminal 40.

The diode switching circuit is completed by similar resistors 56, 57, 58, 59, and 60, respectively, connected to the anodes of diodes 51 through 55, respectively. The respective other sides of resistors 56 through 60 are interconnected and directly connected to terminal 45. The diode switching network is thus connected between the source of positive fixed potential 45 and controlling errorsignal terminal 40. The voltage potential at terminal 40 is controlled through the aforedescribed transistor amplifier 35 and the differential amplifier 29. For any voltage at terminal 40, the terminals 61 through 65 receive voltages determined as follows.

Terminal 65 has a voltage which is the voltage at terminal 40 plus the fixed voltage drop across diode 55. The voltage at terminal 64 is the voltage of terminal 40 plus the voltage drop across the two diodes 41 and 54. For purposes of determining the voltage at terminal 64, the diodes 41 and 54 appear to be connected in series. The voltage at terminal 63 is determined by the voltage at terminal 40, plus the voltage drop developed across the three series-connected diodes 41 and 42 and 53. The voltage at terminals 61 and 62 is determined in a similar fashion. It appears that, for any particular voltage at terminal 40, the potentials at terminals 61 through 65 differ from each other by precisely the voltage drop across one diode. As will be described more fully below, this latter rule holds true only for a particular low range of voltages at terminal 40 or if one disregards any circuit elements connected to terminals 61 to 65.

Proceeding now with the description of the D.C. control networks A', B', C', D', and E', it must be emphasized that these stages are all of similar design. For this reason, it seems sufficient to illustrate only one stage in detail. Accordingly, of all five stages, only stage C' is illustrated as a detailed circuit network, and it will be understood that stages A', B', D', and E' are all similar.

Stage C' comprises two transistors 101 and 102 having their emitter electrodes interconnected directly and connected to a common biasing resistor 103, which is grounded. The base electrode of transistor 101 connects to the aforementioned terminal 63, whereby this stage C' is conected to the above-described switching network at a particular operating point thereof. The base electrode of transistor 102 connects to a terminal 73, which, in effect, is conncted to a line 36. Line 36 is connected to the source of positive potential 37.

The stages A', B', D', and E' correspondingly have terminals 71, 72, 74, and 75, all connected to line 36 and individually connected to base electrodes of transistors which in each individual stage correspond to transistor 102 in stage C'. It will be appreciated that terminals 61, 62, 64, and 65 are respectively connected to base electrodes of transistors in stages A', B', D', and E', respectively, which latter transistors individually correspond to transistor 101 in stage C'.

The collector electrodes of transistors 101 and 102 are connected through resistors 104 and 105, respectively, to lines 83a and 83b, respectively. These lines 83a and 83b operatively interconnect stages C and C'. Correspondingly, there are provided lines 81a and 81b interconnecting stages A and A'. Lines 82a and 82b correspondingly interconnect stages B and B'. Lines 84a and 84b interconnect stages D and D'; and lines 85a and 85b interconnect stages E and E'.

Proceeding now with the description of stage C', the collector electrodes of transistors 101 and 102 are interconected by two series-connected capacitors 106 and 107 having their common junction connected to the cathodes of diodes 108 and 109. The anodes of diodes 108 and 109 are respectively connected to the collector electrodes of transistors 101 and 102.

It appears that stage C' is effectively controlled by the variable voltage at terminal 63; stage C' is biased by the voltage applied to the emitter-biasing resistor 103, which voltage is kept at ground potential; stage C' is additionally biased by the voltage of fixed potential derived from terminal 37 through line 36 and applied to the base electrode of transistor 102 through the terminal 73.

Assuming that the voltage at terminal 63 is zero or close to ground potential, transistor 101 is completely cut off and transistor 102 conducts at about saturation. When the potential at terminal 63 increases and approaches the potential at terminal 73, transistor 101 will draw some of the emitter current flowing through resistor 103; upon further increase of the potential at terminal 63, transistor 101 will be rendered conductive at about saturation level so that transistor 102 is being cut off. In between, that is, when the potentials at terminals 63 and 73 are equal, both of the transistors conduct equally. Accordingly, at low-voltage values for terminal 63, current will flow through line 83b, but no current will flow through line 83a. When terminals 63 and 73 are at equal potential, the currents flowing through lines 83a and 83b are equal. Upon further increase of the potential at terminal 63, no current will flow through line 83b, but all of the current for the transistors will flow through line 83a.

It will be appreciated that the potential at terminal 63 will not rise substantially above that at terminal 73, since, upon saturation of transistor 101, the base voltage thereof is substantially that of the emitter. Accordingly, any further increase of the voltage at terminal 40 will not affect terminal 63, so that diode 53 will soon cease to conduct current.

Figure 2:
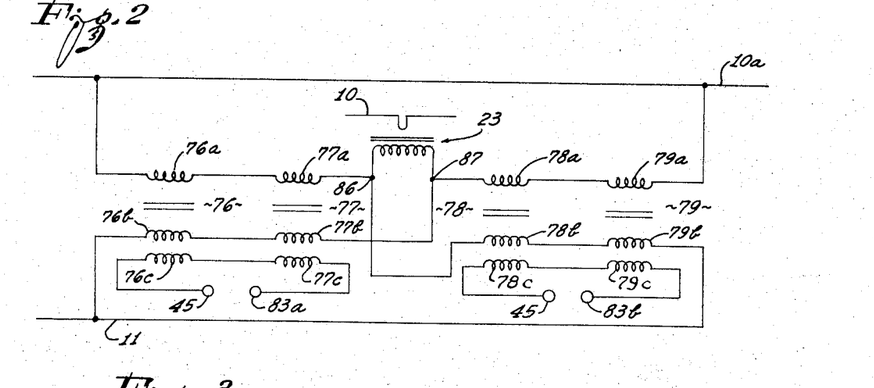
FIG. 2 illustrates on an enlarged scale one of the five magnetic amplifier stages of the network illustrated in FIG. 1.

Proceeding now to the description of compensating voltage control stages A, B, C, D and E, it will be appreciated that they are all similar in design, so that only one stage thereof needs to be shown and described in detail (see also FIG. 2).

Stage C, for example, includes switching means which may take the form in one embodiment of four saturable reactors 76, 77, 78, and 79, each having three windings, respectively denoted by suffices a, b and c. For example, the saturable reactor 76 may have three windings 76a, 76b and 76c. Saturable reactors 76 and 77 are connected to provide for the addition of a compensating voltage by transformer 23 into the line 10 when the reactors become saturated. As illustrated in FIG. 2, the two reactors 76 and 77 respectively have first A.C. windings 76a and 77a connected in series between terminal 86 and line 10a. Line 10a is a reference line kept at input potentials for line 10. The two reactors 76 and 77 respectively have a second A.C. winding 76b and 77b connected in series between terminal 87 and line 11. The third windings 76c and 77c of the two reactors are connected in series between D.C. terminal 45 and output line 83a from stage C'.

Whenever a D.C. premagnetizing or biasing current flows through D.C. biasing windings 76c and 77c, the reactors 76 and 77 are shifted into magnetically saturated conditions such that a low impedance is produced in the reactors 76 and 77. This causes current to flow through a circuit including the terminal 10a, windings 76a and 77a, the terminal 86, the primary winding of the transformer 23, the terminal 87, the winding 77b, the winding 76b and the terminal 11. Since the current flow is from the terminal 86 to the terminal 87, an A.C. voltage is established having a phase relationship to that of the voltage between lines 10 (and 10a) and 11 so that transformer 23 furnishes an adding voltage to the line voltage. In other words, the transformer output is in phase with the line voltage, so that the amplitudes of the transformer output and the line voltage are fully added.

It will be appreciated that the voltage established between terminals 86 and 87 has a phase relationship to the line voltage which is determined either by the direction of the D.C. current in biasing windings 76c and 77c, or by the sense of winding coils 76a, 77a, 76b and 77b. Thus, either by reversing the D.C. bias or by reverting the sense of winding of the A.C. coils, one can establish opposite phase relationships as between the output of transformer 23 and the line voltage between lines 10 and 11.

The reactors 78 and 79 have their several windings connected so that a D.C. current from line 83b into windings 78c and 79c saturates the reactors 78 and 79, thereby causing a low impedance to be produced in the reactors. This in turn causes current to flow through a circuit including the terminal 10a, the windings 79a and 78a, the terminal 87, the primary winding of the terminal 23, the terminal 86, the windings 78b and 79b and the terminal 11. Since the current flows from the terminal 87 to the terminal 86, an A.C. voltage is established across terminals 86 and 87 such that the output voltage of transformer 23 is 180° electrically out of phase with the line voltage to furnish a subtracting voltage.

A direct current of equal magnitude in windings 76c and 77c and in windings 78c and 79c establishes equal potentials at terminals 86 and 87 at all times, so that no voltage is induced in the secondary winding of transformer 23. A slight excess of current in the windings 76c and 77c relative to that in the windings 78c and 79c establishes a small additive voltage in the transformer 23 for increasing the voltage in the line 10 but does not saturate any of the saturable reactors. Similarly, a slight excess of current in the windings 78c and 79c relative to that in the windings 76c and 77c establishes a small voltage in the transformer 23 for decreasing the voltage in the line 10 but does not saturate any of the saturable reactors.

Accordingly, by suitably varying the currents in lines 83a and 83b, one can control the output voltage of the transformer 23 either to "add fully," "add partially," "add zero," "subtract partially," or "subtract fully" relative to the voltage in line 10. "Fully" adding or subtracting means operating the reactors 76 and 77 or the reactors 78 and 79 at maximum current in line 83a or 83b by saturating the appropriate pair of reactors. It will be recalled that the currents in lines 83a and 83b are controlled by transistors 101 and 102 having a common emitter bias so that the collector currents of the transistors always vary in opposite directions. Accordingly, the D.C. biasing of reactors 76, 77 and 78, 79 always varies in opposite directions.

Since a current flowing in line 83a is the collector current of transistor 101, causing transformer 23 to add a compensating voltage to the unregulated voltage, transistor 101 will be called an adding transistor. There are, of course, corresponding adding transistors in stages A', B', D', and E'. For an analogous reason, transistor 102 is a subtracting transistor, and there are corresponding subtracting transistors in the other stages.

Looking at stages C and C' together, it will be appreciated that the saturable reactors in stage C inductively couple the transistors of stage C' to the line. In order to avoid any surging and particularly any voltage peaks resulting therefrom to be induced into the D.C. circuit, which includes the transistors, diodes 108 and 109 pass off any such voltage peaks tending to reverse the current in any transistor. Surges of opposite polarity are drawn to the capacitors 106 and 107.

Proceeding now to the general description of operation, the switching network comprising diodes 41 to 44 and 51 to 55 cooperates with the stages A' to E' as follows: There are two extreme operating conditions. The first one is that the potential at terminal 40 is below a particular minimum voltage, so that the potentials at terminals 61 to 65 are all below the potential of line 36 (with terminals 71 to 75). In this case, the subtracting transistor 102 of stage C' is rendered fully conductive; and so are all of the corresponding subtracting transistors in the other stages A', B', D', and E'. Accordingly, all lines 81b, 82b, 83b, 84b, and 85b feed maximum biasing currents into the subtracting magnetic amplifiers of stages A, B, C, D, and E; and all of the transformers 21, 22, 23, 24, and 25 subtract 2 volts each from the input voltage as between lines 10 and 11. If 115 volts is the desired output voltage, this operating condition prevails as long as the input-line voltage is above about 125 volts. The error-signal network including differential amplifier 29 and amplifier 35 is destined to develop a voltage at terminal 40 keeping all subtracting transistors conductive as long as the input line voltage is above 125 volts. When the input-line voltage declines from 125 volts to 121 volts, stage E' changes its operating conditions in such a manner that the current in the subtracting transistor decreases and the current in the adding transistor increases, until, at an input-line voltage of 121 volts, the adding transistor of stage E' is rendered saturated and the subtracting transistor of stage E' is cut off. No current flows in lines 81b, 82b, 83b, 84b, and 85a. Accordingly, each of the transformers 21, 22, 23, and 24 subtracts 2 volts, but transformer 25 adds 2 volts to re-establish approximately 115 volts at the output terminals.

A decline in the input-line voltage from 121 to 117 volts results in change-over of conduction from the subtracting transistor in stage D' to the adding transistor thereof, so that transformer 24 is reversed from subtracting to adding.

Upon further decrease of the line voltage to the desired value of 115 volts, transistors 101 and 102 conduct equally, so that the premagnetization currents of lines 83a and 83b are equal. Accordingly, during any time of operation, no potential difference is being developed between terminals 86 and 87. Now transformers 21 and 22 subtract, and transformers 24 and 25 add voltage increments of 2 volts each; but transformer 23 does not contribute anything. Upon a decline of the line voltage from 115 to 113 volts, the current shifts entirely to adding transistor 101, with subtracting transistor 102 being cut off—whereupon transformer 23 also adds.

It will be appreciated that, upon further decline of the line voltage to 109 volts, transformer 22 reverts from subtracting to adding; and when the input-line voltage falls below 105 volts, all the transformers 21, 22, 23, 24, and 25 add their respective 2 volts of compensating voltage. In this case, the voltage at terminal 40 has risen to such a value that all the diodes 52 and 55 are being biased reversely; and, with any further increase of the voltage at terminal 40, diode 51 will also cut off, with the current through diodes 41 to 44 when being drawn exclusively through resistor 46. This constitutes the second extreme operating condition, i.e., the input-line voltage then being below 105 volts.

During another phase of voltage control, the input-line voltage may be a voltage between 105 and 109 volts. For any input-line voltage between 105 and 109 volts, each of the transformers 22, 23, 24 and 25 adds voltage increments of 2 volts. The voltage increment furnished by each transformer is almost completely sinusoidal and substantially free from harmonics. Transformer 21 is controlled to either add or subtract an increment of 2 volts, and the amplitude of any harmonics developed when any voltage increment in the order of 1 volt is added or subtracted by the transformer 21 is low as compared with the entire amount of the compensating voltage to be furnished by the control network. Moreover, if the unregulated input voltage is, for example, about 105, 107, 109, 111 volts, etc., there will be no harmonics at all, since in either case the several transformers will add or subtract a full wave, and one of the transformers will neither add nor subtract any voltage.

There are several important advantages to the invention described above. One advantage results from the fact that each of the stages A, B, C, D and E and the associated one of the stages A', B', C', D' and E' in FIGURE 1 operates to provide voltage increments such as increments of 2 volts and that these voltage increments may be either positive or negative. When the stages provide a full voltage increment of 2 volts, they introduce relatively little distortion into the regulated voltage because of the saturation produced in the reactors in these stages such as the reactors 76, 77 and the reactors 78, 79 in the stage C in FIGURE 2. This may be seen by way of illustration in the fact that the primary winding provides substantially the only impedance in the circuit when the reactors 76 and 77 become saturated.

Furthermore, only one of the stages A, B, C, D and E can be in an unsaturated state at any one time. Only the stage in the unsaturated state can introduce into the regulated output voltage any significant errors such as wave distortion or phase shift resulting from harmonics, such distortions resulting from the unsaturated condition of the reactors in that stage. However, even the distortions introduced by the unsaturated one of the stages A, B, C, D and E are fairly limited since the total contribution by the stages toward the regulated output voltage is divided betweeen a number of stages so that the contribution of each stage is limited to the value of the voltage increment such as 2 volts.

In the foregoing description of the network and its operation, it is assumed that taps 17 and 19 short-circuit each other, so that the control-input voltage is solely determined by transformer 14. This condition prevails if the regulated voltage is solely determined by a particularly desired value at the output terminals. However, the primary point of interest is the voltage as it will be applied to a load, and voltage regulation is required primarily to maintain a predetermined level for the load. If the load is directly connected to the output terminals of the lines 10 and 11, that is to say, if the connectors between the output terminals of lines 10 and 11 and the load terminals do affect the voltage only to a negligible degree, no further problem arises. The situation is different, however, if a long cable is interposed between the output terminals of lines 10 and 11 and the load. In this case, the load current produces a voltage drop in the cable, so that the voltage as applied to the load differs materially from the regulated voltage.

In order to compensate for this effect, two transformers 90 and 91 are provided. The primary windings of these transformers are directly inserted into line 10, so that in either case the primary transformer current is the line load current. Transformers 90 and 91 differ structurally in that transformer 90 provides relatively loose coupling between its primary winding and its secondary winding, whereas the transformer 91 provides a strong coupling between its primary and secondary windings. Accordingly, the iron for the transformer 91 has a high permeability, with the windings coupled closely and with little stray flux; the iron for transformer 90 has a low permeability, and there may even be an air gap.

Potentiometer 18 is connected across the secondary winding of transformer 90; potentiometer 26 is connected across the secondary winding of transformer 91. Accordingly, the two secondary windings are connected in series.

Adjustment of tap 19 introduces a voltage into the line-voltage monitoring device; i.e., it adds a particular voltage component to that devleoped across secondary winding 15 of transformer 14. This added voltage component represents the voltage drop produced by the resistivity of the cable. In other words, potentiometer 26 with tap 19 introduces into the control network a voltage component causing the entire voltage regulator to control towards a voltage higher than 115 volts and having such a value that the load receives precisely 115 volts. The adjustment of tap 19 accommodates a particular cable. If the load varies, the load current will be different accordingly, so that the component added to the voltage across secondary winding 15 will also be different, without necessitating readjustment of tap 19. Of course, if a different cable is being used, longer or shorter, thicker or thinner, tap 19 has to be readjusted.

Adjustment of tap 17 permits the introduction of a second voltage component indicative of the inductivity of the cable and representing the loss in voltage in the cable due to its inductivity. This voltage component will vary without variation of the tap 17, not only if the cable is altered, but also if the power-line frequency varies.

The mode of operation is basically not altered by the additional provision of transformers 90 and 91, but the changeover in each stage A through E will occur at different levels.

The aforedescribed embodiment is characterized best as a combination of mixed analog and digital control means. There are always four stages operating in the digital mode in adding or subtracting fixed quantities. The fixed quantity furnished by either stage has a similar amplitude, thus representing a linear scale with 2 volts as a unit. As long as the unregulated voltage remains in the range covered by this device, one of the stages will always operate in the analog mode for purposes of fine control. The principal feature of the aforedescribed embodiment is that each stage can operate in the digital and in the analog mode, and the shift from analog to digital is governed by the diode switching device (FIG. 3).

Proceeding now to the detailed description of FIG. 4, there is shown a network which can also be described best as one operating in a mixed mode, whereby analog as well as digital principles are used. However, the digital mode operates on a binary scale.

There are again shown lines 10 and 11 and line-input and output terminals. Line 10 includes the secondary windings of five transformers denoted by reference numerals 121, 122, 123, 124, and 125. The primary windings of these transformers are individually controlled in a manner to be described as follows. The transformer primaries 121, 122, and 123 are governed by stages X, Y, and Z, respectively. Each of these stages is designed basically as illustrated in FIG. 2; that is to say, each of these stages includes a reactor system, wherein altogether four saturable reactors are interconnected in order to establish a primary voltage in the respectively connected transformer so that the transformer output voltage is either in phase or in opposite phase relation to the input line voltage, whereby the particular phase is determined by the D.C. voltage applied thereto, particularly to lines such as 181a and 181b for stage X; 182a and 182b for stage Y; and 183a and 183b for stage Z.

As indicated symbolically in the drawing, the stages X, Y, and Z in cooperation with the transformers 121, 122, and 123, respectively, do not furnish sinusoidal voltages of equal amplitude; but stage X with transformer 121 is dimensioned to furnish ±1 volt, stage Y with transformer 122 furnishes ±2 volts, and stage Z furnishes ±4 volts. It will be understood that these rules for dimensioning do not require a completely different design. For example, stages X, Y, and Z and can be wired to establish similar networks, while the different voltages are obtained by selecting different numbers of turns in the primary and/or the secondary windings of the three transformers. Alternatively, the transformers can all be similar, but the voltages applied thereto by the different stages are different due to a variation in reactor layout.

For the sake of completeness, it should be mentioned that lines such as 181a and 181b correspond to terminals 83a and 83b in FIG. 2. A return and reference potential terminal, such as 45 in FIG. 2, has been omitted from FIG. 4 in order to simplify the illustration.

A predetermined current of constant value in lines 181a, 182a, and 183a respectively controls stages X, Y, and Z, so that transformers 121, 122, and 123 respectively furnish +1, +2, and +4 volts. During this stage of operation, no current flows through lines 181b, 182b, and 183b. Conversely, a predetermined and constant current in lines 181b, 182b, and 183b with a zero current in lines 181a, 182a, and 183a causes the said transformers to furnish voltages of opposite phase, as denoted by the minus sign.

Transformer 124 furnishes a voltage of +1 volt. This voltage is introduced into line 10 without being influenced by any further control action. As will be described more fully below, the purpose of this transformer 124 is to shift the zero mark of the control apparatus.

A stage W controls transformer 125, and this stage W is wired similarly to the aforedescribed stages denoted by capital letters. Stage W is governed by a D.C. transistorized control stage 206. This stage 206 can be wired similarly to stage C' in FIG. 1. For convenience and simplification, only the two transistors 208 and 209 are shown, and their respective collector currents are being fed to lines 184a and 184b, these latter lines corresponding to terminals 83a and 83b in FIG. 2.

Transistor 209 has its base connected to a source of constant voltage 205, while a variable voltage is applied to the base electrode of transistor 208. Due to this latter fact, stage W is being controlled to render the voltage inserted by transformer 125 into line 10 a variable one, with the range of variation being ±1 volt. Again, transistor 208 is the adding transistor, and transistor 209 is the subtracting transistor, to characterize the resulting compensating voltage furnished by transformer 125 when either transistor 208 or 209 is rendered conductive.

The output voltage of lines 10 and 11 is being monitored and fed to a comparator 201. A reference voltage is also being applied to the comparator 201, and the resulting error signal is first fed to an analog-to-digital converter 202. It should be mentioned that the error signal furnished by comparator 201 does not alter its polarity during the control operation, a situation which is similar to the one described above with reference to the voltage at terminal 40 in FIG. 1. Accordingly, there arises no difficulty in the production of a digital signal. In FIG. 4 there are provided three output channels of the converter 202, with the smallest digital value developed being represented by a combination 000 and the highest being LLL. It will be developed more fully below that a binary-digital signal 000 will require the subtraction of at least 7 volts from the input-line voltage and that a signal LLL will require the addition of at least 7 volts to the input-line voltage.

The three digital output channels of converter 202 are individually connected to one input side of two-input flip-flops 211, 212, and 213. The other input side of these flip-flops is connected respectively to the same output channels of the converter 202, but there are inverter stages 221, 222, and 223 interconnected between the respective converter output channels and the flip-flops. It will, therefore, be appreciated that a signal such as 000 at the analog-to-digital converter output switches the flip-flops 211, 212, and 213 through appropriate command signals derived through the inverter stages, whereas an "L" signal at any of the converter output channels reverts the state of the respective flip-flop.

The digital output of the converter 202 is next being fed to a digital-to-analog converter 203. This converter 203 always furnishes an analog signal which remains constant for each output of converter 202. For purposes of convenience, the input side of comparator 204 which is connected to comparator 201 shall be called the analog input side, and the input side connected to the analog output of converter 203 shall be called the d/a input.

This analog value is being fed to a comparator 204, to be compared with the error signal derived from comparator 201. Hence the output of comparator 204 always covers the fractional values of the error voltage corresponding to compensating voltage increments below +1 volt and above −1 volt, regardless of the absolute amount of error and required compensating voltages.

It should be mentioned that there is a distinction between the digital mode of control, as far as the adding and subtracting of compensating voltage is concerned, and the digital mode of controlling A.C. control stages such as X, Y, and Z. There is a correlation between these two types of digital control modes. The compensating voltages are added and subtracted, with the amplitudes being arranged on a binary scale, and an arbitrarily selected 1 volt represents the bit unit. However, transformers 121, 122, and 123 either add or subtract 1 volt, so that different combinations available differ from each other by 2 volts. Each combination of compensating voltages thus added to and/or subtracted from the unregulated line voltage corresponds to a digital number in binary code at the output side of the converter 202.

Considering the output of converter 202, one will see that there is the following relation between the binary code and the compensating voltages furnished by transformers 121, 122, and 123 together.

|  | Volts |
|---|---|
| 000 | −7 |
| L00 | −5 |
| 0L0 | −3 |
| LL0 | −1 |
| 00L | +1 |
| L0L | +3 |
| 0LL | +5 |
| LLL | +7 |

It is immaterial what the voltage level is for each of the L-bits, since the output transformer voltage is determined primarily by the gain of stages X, Y, and Z. It is also immaterial what the specific analog values are in volts as they appear at the output side of comparator 201, which is the analog input side of converter 202. It is important, however, that there is a unique relationship, on the one hand, between specific signal levels at the output side of comparator 201 and the binary digital code value thereof at converter 202, and, on the other hand, the different combinations of adding and subtracting 1, 2, and 4 volts, always assuming that the output of transformer 125 is zero and that static-regulating conditions have been established. In the following explanation, "integral" signal values at the output side of comparator 201 are error signal values, respectively causing the establishing of total compensating voltages which differ from each other by integral multiples of the lowest voltage range covered by the digital compensating voltages. In the present case, this range is 2 volts as covered by stage X, and "integral" error signal values will be found at the output of comparator 201 when compensating voltages according to the table in the previous paragraph are being required and whenever stage W furnishes an output zero for transformer 125.

It will thus be understood that "integral" signal values at the output of comparator 201 are those values causing transistors 208 and 209 to conduct at equal strength. Accordingly, "fractional" voltage values at the output of comparator 201 are those voltage fractions to be inserted by the transformer 125.

It is reasonable and convenient for describing the present invention to calibrate or to consider the output voltage of comparator 201 in values of compensating voltages needed, whereby, however, an arbitrary origin value is selected as reference so that, in fact, the sign of the output voltage of comparator 201 remains the same. Accordingly, the binary-digital values furnished by the analog-to-digital converter 202 are counted in units defined by, but not equal to, the output voltages furnished by transformers 121, 122, and 123.

As can be seen in FIG. 4 of the drawing, transistor 208 is governed by the output of comparator 204. The networks 204 and 206 are so designed that transistor 208 will be rendered nonconductive at an error voltage slightly above a particular binary value, and transistor 208 will be rendered fully conductive with a corresponding cutoff of transistor 209 at an error voltage which does not quite correspond to the next higher binary value.

The device illustrated in FIG. 4 operates as follows. The stages X, Y, and Z respectively develop signals for introducing ±1 volt, ±2 volts, and ±4 volts into line 10 respectively by means of the transformers 121, 122, and 123. The system is adjusted, for example, so that the transformers (121, 122, 123) introduce the voltages (+1, +2, +4) for the correct and desired line voltage, leaving a residue of −1 volt. Accordingly, transformer 124 introduces a fixed +1 volt, and transformer 125 introduces zero volts. The flip-flops 211, 212, 213 are thus in a state (on, on, off) so that normal line voltage is represented by an output of the analog-digital converter 202 (LL0). The reference voltage applied to comparator 201 is thus to be adjusted so that, at normal and desired line voltage, analog-digital converter 201 furnishes indeed an output (LL0). The signal developed concurrently at the output of digital-analog converter 203 is thus precisely representative for 1 volt compensating voltage, and comparator 204 is adjusted to control stage 206 so that transistors 208 and 209 conduct equally and below saturation, so that stage W causes transformer 125 neither to subtract nor to add any volts relative to the line voltage.

Suppose, now, that the line voltage at the input side has been decreased by 1 volt so that +1 volt is being added thereto. Then the output of comparator 201 decreases somewhat in the next lower "integral" value as defined above. So does the analog-input side of comparator 204 cutting off transistor 209, so that transistor 208 conducts at saturation and stage W causes the transformer to add about 1 volt. Accordingly, the transformers (121, 122, 123, 124, 125) introduce into line 10 the following voltages (+1, +2, −4, +1, +1).

Suppose the line voltage at the input side has been decreased further, but only slightly, then the comparator 201 will furnish a signal which causes analog-to-digital converter 201 to switch to a new output and to furnish an output (00L), this being only a matter of adjustment. Accordingly, all the flip-flops 211, 212, and 213 will reverse their states so that flip-flops 211 and 212 are off, flip-flop 213 then being on. Digital-to-analog converter 203 now produces the digital-analog output corresponding to binary input signal 00L at the selected scale. Accordingly, the d/a input side of comparator 204 jumps up, while there has been only a very small change on the analog-input side thereof. The control voltage as now applied to the base of transistor 208 jumps up, cutting transistor 208 off so as to shift conduction entirely over to the previously cut off transistor 209. Accordingly, the output of stage 206 reverses so that stage W causes transformer 125 to introduce −1 volt.

It will be appreciated that a compensating voltage of +1 volt can be composed in two ways by transformers (121, 122, 123, 124, 125):

(1)           (+1, +2, −4, +1, +1)
(2)           (−1, −2, +4, +1, −1)

In order to avoid uncertainty in the switching operations, one can select analog-to-digital converter 202 so that a switch-over to the next higher digital value will occur at a slightly higher analog value than a switch-over from the next higher value to the original one.

As the line voltage declines further at the input side of line 10, the amount of additional compensating voltage is being regulated by stage W in that the output of comparator 204 shifts from conduction of transistor 209 to conduction of transistor 208, whereby the voltage of transformer 125 shifts from −1 volt through zero to +1 volt. It will be appreciated that when the output of transformer 125 again reaches +1 volt, another switching action occurs at converter 202, and converter 203 causes stages 206 and W and transformer 125 to re-establish −1 volt. With the system outlined above, change-over in the digital transformers 121, 122, 123 occurs not only at compensating voltages of +1, +3, +5, and +7 volts, but also at −1, −3, and −5 volts. For compensating voltages having even-number values, stages 206 and W control transformer 125 to furnish zero volts.

The transformer 124 is destined solely for determining at what combination of outputs of transformers 121, 122, and 123 there is compensating voltage zero. If transformer 124 were omitted, then a change-over in the digital transformers would occur at even-numbered values including zero, which mode of opeartion might be undesirable. This zero-shift transformer 124 can shift the zero compensating voltage to any value, whereby, with a given system, the range of positive compensating voltages and the range of negative compensating voltages are altered oppositely. With +1 volt furnished by the transformer 124, the highest negative compensating voltage which can be established is −7 volts, and the highest positive compensating voltage is +9 volts. Without transformer 124, the values would be ±8 volts.

It is significant that the digital-control mode transformers 121, 122, and 123 are being operated in such a manner that they are always to add or subtract fully from the line voltage. Either transformer 121, 122, or 123 could also be controlled to furnish zero voltage selectively, yet without introducing harmonics, so that either stage X, Y, or Z would then be controlled to assume either one of several states—on-positive, zero, or on-negative. Moreover, in this case stage W would only require a maximum of ±½ volt to cover the entire range. This would still further reduce the content of harmonics.

The following table illustrates how the various compensating voltages are established:

| Compensating Voltage | A/D Representation | Stage W |
|---|---|---|
| −3 | L00 | +1 |
|  | Switching |  |
| −3 | 0L0 | −1 |
| −2 | 0L0 | 0 |
| −1 | 0L0 | +1 |
|  | Switching |  |
| −1 | LL0 | −1 |
| 0 | LL0 | 0 |
| +1 | LL0 | +1 |
|  | Switching |  |
| +1 | 00L | −1 |
| +2 | 00L | 0 |
| +3 | 00L | +1 |
|  | Switching |  |
| +3 | L0L | −1 |

Figure 5:
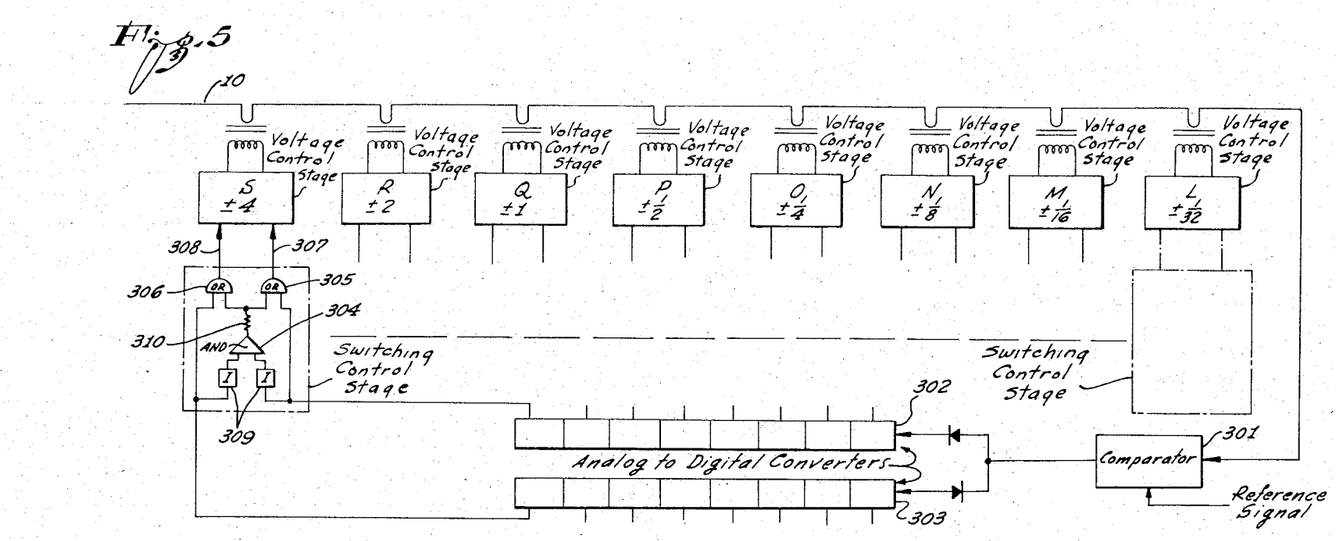
FIG. 5 illustrates a block diagram of an automatic control device using entirely digital components.

Proceeding now to the detailed description of FIG. 5, there is shown an example in which the entire compensating voltage to be inserted into line 10 is composed of fixed values which are related to each other on a binary scale. The unit of this binary scale determines the accuracy of the output voltage. In the embodiment shown, such a unit has been selected as $\frac{1}{32}$ volt. The binary scale includes eight positions, with 4 volts being the highest value attainable with one transformer; and, of course, the highest and lowest compensating voltages attainable with this system are $7\frac{31}{32}$ volts.

There are provided reactor stages L, M, N, O, P, Q, R, and S—all wired in a manner shown in FIG. 2 and all controlling individually transformers such as 23 of FIG. 2. The compensating voltage furnished by each stage in co-operation with its transformer can be determined either by the wiring of the stage or by the number of turns within the transformer, as described in connection with FIG. 4.

The eight stages L through S are controlled by a digital-type network which includes first an analog signal comparator 301, comparing the line voltage with a reference signal. In this case, the signal furnished by comparator 301 is a true error signal; that is to say, if the line voltage has exactly the desired value, the comparator 301 will furnish the output zero. Positive and negative deviations of the line voltage from the desired value respectively result in positive and negative error signals.

A positive error signal is fed to analog-to-digital converter 302; a negative error signal is fed to a similar converter 303. In accordance with the entire layout, each analog-to-digital converter has eight stages, and the binary signal output has as its corresponding analog unit a voltage value at comparator 301 which corresponds to a required compensating voltage of $\frac{1}{32}$ volt. The converters are, furthermore, wired in that a positive error signal will cause all of the stages of converter 303 to furnish the bit "0," and a negative error signal will cause converter 302 to furnish a bit "0" in all of its stages. Each of the stages of analog-to-digital converter 302 furnishes an input line to a switching-control stage. To simplify orientation, only the last stage of each converter is shown to be connected to the control stage which governs the reactor-type control stage S, which, in turn, governs the transformer for the highest compensating voltage furnishable with one transformer. This control stage comprises two "OR" gates 305 and 306, and one input terminal of "OR" gate 305 connects directly to the last output stage of analog-to-digital converter 302. The output terminal of "OR" gate 305 is connected to a line 307, which corresponds to terminal 83b in FIG. 2. Correspondingly, the last stage of converter 303 connects to one input terminal of "OR" gate 306 having its output line 308 connected to stage S, and this output line 308 corresponds to terminal 83a in FIG. 2.

Each of these last converter output stages respectively connects to an inverter stage such as 309, having its respective outputs connected to the input terminals of an "AND" gate 304. The output of "AND" gate 304 connects through a resistor 310 to the respective other input terminals of "OR" gates 305 and 306. Accordingly, a bit "0" in both of the last stages of converters 302 and 303, indicative of an error voltage corresponding to less than the required compensating voltage of 4 volts, results in L signals for both input terminals of "AND" gate 304; and the attenuating resistor 310 causes similar signals to be applied to lines 307 and 308 controlling stage S in such a manner that its output transformer produces zero output voltage.

An L-bit, at one of the last stages of either the converter 302 or the converter 303, results in a strong current in line 307 with no current in line 308 or in a strong current in line 308 with no current in line 307. In either case, the transformer connected to stage S will furnish 4 volts, which are either in phase or in opposite phase relationship to the line voltage.

It will be appreciated that each and all of the stages L through R are connected to the analog-to-digital converters in a similar manner.

Proceeding now to the description of the operation of FIG. 5, an error signal is being formed in comparator 301, comparing the line voltage with a reference signal, whereby, contrary to the aforedescribed embodiments, the output of comparator 301 will be zero when the line voltage has the desired value.

As a positive error signal is developed, it is being fed to the analog-to-digital converter 302. The digital unit represents the smallest binary-voltage increment introduceable into the line, for example, $\frac{1}{32}$ of a volt, which value also is the lower tolerance limit, determining the accuracy of the regulation. If, for example, a compensating voltage of about $4\frac{3}{8}$ volts is desired, the digital output of converter 302 will be (L, L, 0, 0, 0, L, 0, L), which digital number will result from conversion of the error signal drawn from comparator 301.

Control of stage S is to be described as an example. Assuming that the last stage of analog-to-digital converter 302 has bit L, then the corresponding last stage of converter 303 is necessarily 0. Accordingly, the inputs of the "AND" circuit 304 are unequal, and no output is furnished by the "AND" circuit 304. The L-bit signal from converter 302 thus passes through the "OR" gate 305 to D.C. input line 307, while the output at "OR" gate 306 furnishes zero in D.C. input line 308. Accordingly, stage S is controlled to cause introduction of −4 volts by its output transformer.

When both corresponding stages of converters 302 and 303 are 0, indicating that either a positive or a negative compensating voltage below 4 volts is required, the inverters 309 furnish equal outputs L; and "AND" gate 304, through attenuator 310 and "OR" circuits 306 and 305, furnishes command signals balancing stage S to furnish output transformer voltage 0. If +4 volts are required, the last stage of converter 303 will furnish an L-bit signal, causing such an L-bit signal to appear in D.C. input line 308, while D.C. input line 307 receives no current.

Each such stage L to S can, therefore, be controlled to furnish a fixed positive or a fixed negative voltage or no output voltage at all. In this embodiment, no harmonics are introduced into the power line, provided that the smallest voltage available suffices for the desired accuracy. If not, one can introduce a stage of variable control voltage having the value of the smallest fixed voltages as limits and being controlled between these limits.

Figure 6:
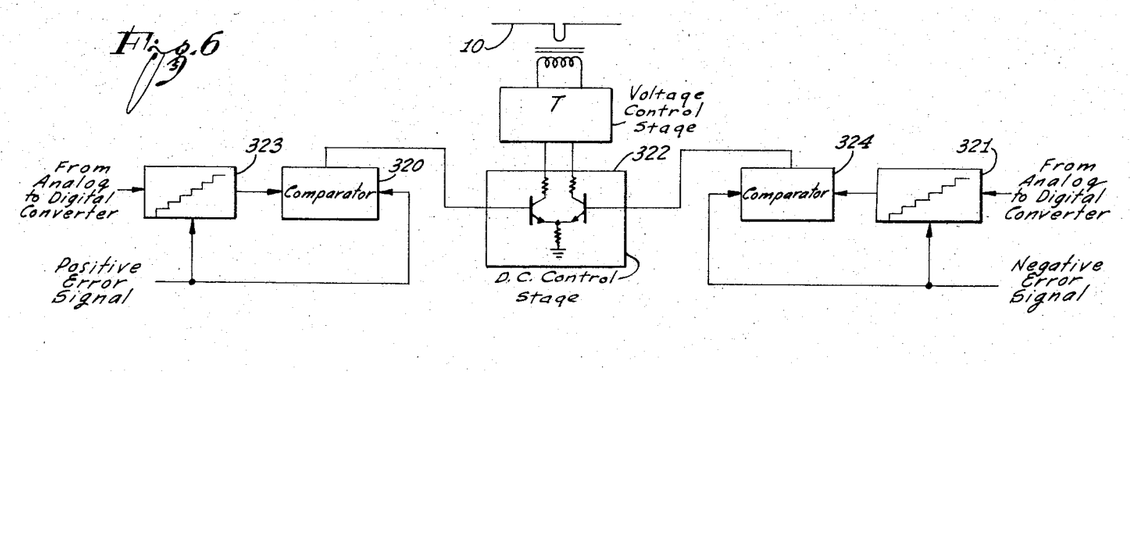
FIG. 6 illustrates a block diagram of a network for supplementing the device shown in FIG. 5 by analog fine control means.

Such a supplementary network is shown by way of example in FIG. 6. The stage T thereof introduces a variable control voltage which has positive and negative limits of half the voltage furnished by the smallest digital-mode compensating transformer. Assuming that the network shown in FIG. 6 would supplement that of FIG. 5, the output transformer of stage T would furnish voltages in between the limits of ±1/64 volt.

If the error signal is positive, it is being fed to a comparator 320, receiving on its other input a signal representing in analog form the digital signal of the converter such as 302 of FIG. 5. This can be done simply by using a step function generator 321 of conventional design producing a step function signal directly out of the positive error signal. There may be a trigger signal drawn from the analog-to-digital converter 302 to synchronize a change in the converter output with the stepping of the step function generator 321.

It should be mentioned that this generator is used in lieu of a digital-analog converter such as 203 in FIG. 4. The purpose is similar to that as outlined above; namely, to shift the available control range of stages T and 322 up and down in relation to the actual total amount of compensating voltage needed. Thus, stages T and 322 are variable interpolating stages employed wherever needed to bridge two of the digital-type compensating voltages.

Additionally, there are provided a step function generator 323 and a comparator 324 for cooperation with a negative error signal and with an analog-to-digial converter 303 provided for such a negative error signal.

The invention is not limited to the embodiments described above, but all changes and modifications thereof not constituting departures from the spirit and scope of the invention are intended to be covered by the following claims.

What is claimed is:

1. In combination for controlling a voltage at the output side of a line in accordance with variations of the voltage at the input side of the line:

switching means having first, second and third states of operation and operatively coupled to the input side of the line for introducing into the input side of the line a first voltage increment having a particular amplitude and having a first polarity, a second voltage increment having the particular amplitude and having a second polarity opposite to the first polarity and a third voltage increment having an amplitude less than the particular amplitude and having a selective one of the first and second polarities;

means operatively coupled to the output side of the line for producing a control voltage having an amplitude dependent upon the variations in the voltage on the output side of the line from a controlled value, means for providing a reference voltage, and means responsive to the reference and control voltages and operatively coupled to the switching means for obtaining an operation of the switching means in a selective one of the first, second and third states in accordance with the results of the comparison between the reference and control voltages.

2. In combination for controlling a voltage at the output side of a line in accordance with variations of the voltage at the input side of the line:

switching means having first and second saturable states and having a third unsaturated state and operatively coupled to the input side of the line and operative in the first saturable state to introduce into the input side of the line a first voltage increment having a particular amplitude and aiding characteristics relative to the voltage on the input side of the line and operative in the second saturable state to introduce into the input side of the line a second voltage increment having the particular amplitude and substractive characteristics relative to the voltage on the input side of the line and operative in the third unsaturated state to introduce into the input side of the line a third voltage increment having an ampliture less than the particular amplitude and having a selective one of the aiding and subtractive characteristics;

means for providing a reference voltage;

means operatively coupled to the output side of the line for producing a control voltage having characteristics dependent upon the variations from the reference voltage of the voltage on the output side of the line; and means responsive to the control voltage and operatively coupled to the switching means for obtaining an operation of the switching means in a selective one of the first, second and third states in accordance with the characteristic of the control voltage.

3. In combination for controlling a voltage at the output side of a line in accordance with variations of the voltage at the input side of the line:

means operatively coupled to the output side of the line for provding a control voltage having characteristics dependent upon the variations from a controlled value of the voltage on the output side of the line;

means for providing a reference voltage;

control means having first and second states of operation and a third state comprising a simultaneous operation in the first and second states and responsive to the control voltage and the reference voltage for comparing these voltages to provide an operation of the control means in a selective one of the first, second and third states in accordance with the results of the comparison, and means responsive to the operation of the control means in the selective one of the first, second and third states for introducing into the input side of the line a selective one of a first voltage increment having a particular amplitude and an additive relationship with the voltage on the input side of the line, a second voltage increment having the particular amplitude and a subtractive relationship with the voltage on the input side of the line and a third voltage increment having an amplitude less than the particular amplitude and a selective one of the additive and subtractive characteristics and for respectively providing the selective one of the first, second and third voltage increments in accordance with the operation of the control means in the selective one of the first, second and third states.

4. In combination for controlling a voltage at the output side of a line in accordance with variations of the voltage at the input side of the line:

a first saturable magnetic reactor having a first saturable magnetic core and having first and second windings magnetically coupled to the core to produce a saturation of the core in a first polarity upon a flow through the windings of a current of a first particular magnitude and of a first polarity, a second saturable magnetic reactor having a second saturable magnetic core and having third and fourth windings magnetically coupled to the second core to produce a saturation of the second core in a second polarity upon a flow through the windings of a current of the first particular magnitude and of a second polarity opposite to the first polarity, control means connecting the first, second, third and fourth windings in a bridge relationship having first and second pairs of opposite legs with the first and second windings constituting the first pair of opposite legs in the bridge and with the third and fourth windings constituting the second pair of opposite legs in the bridge, first means coupled to the first and second windings and to the third and fourth windings in a push-pull relationship to selectively produce one of first and second operations where the first operation constitutes an increase of the current of the first polarity through the first and second windings to the particular magnitude and simultaneously a decrease of the current of the second polarity through the third and fourth windings below the particular magnitude and the second operation constitutes an increase of the current of the second polarity through the third and fourth windings to the particular amplitude and simultaneously a decrease of the current of the first polarity through the first and second windings below the particular amplitude, means for providing a reference voltage, means coupled to the control means and to the output side of the line and to the reference voltage means for obtaining selective ones of the first and second operations of the control means in accordance with the variations in the voltage at the output side of the line from the reference voltage, and means coupled to the first and second saturable reactors and to the input side of the line for introducing to the input side of the line a voltage of a particular amplitude and a first polarity upon a saturation of the first saturable magnetic reactor, a voltage of a particular amplitude and a second polarity upon a saturation of the second saturable magnetic reactor and a variable voltage less than the particular amplitude in accordance with the relative state of saturation of the first and second saturable magnetic reactors when neither of the first and second saturable magnetic reactors becomes saturated.

5. In combination for controlling a voltage at the input side of a line in accordance with variations of the voltage at the output side of the line:

first saturable means having characteristics for remaining unsaturated upon the introduction to the first saturable means of a current of an amplitude less than a particular value and having characteristics for becoming saturated upon the introduction to the first saturable means of a current of an amplitude at least equal to the particular value, second saturable means having characteristics for remaining unsaturated upon the introduction to the second saturable means of a current of an amplitude less than the particular value and having characteristics for becoming saturated upon the introduction to the second saturable means of a current of an amplitude at least equal to the particular value, control means connecting the first and second saturable means in a push-pull relationship to provide a first operation with the first saturable means receiving a current having an amplitude of at least the particular value and with the second saturable means receiving a current having an amplitude less than the particular value and to provide a second operation with the first saturable means receiving a current having an amplitude less than the particular value and with the second saturable means receiving a current having an amplitude of at least the particular value and to provide a third operation with both of the first and second saturable means receiving currents having amplitudes less than the particular value, means for providing a reference voltage, first means coupled to the control means and to the reference voltage means and the output side of the line for obtaining selective ones of the first and second and third operations of the control means in accordance with variations of the voltage on the output side of the line from the reference voltage, and second means coupled to the first and second saturable means and to the input side of the line for introducing to the input side of the line a compensating voltage dependent upon the operation of the control means in the first, second and third states.

6. The combination set forth in claim 5 wherein the control means provide a third operation with the first and second saturable means simultaneously receiving a current having an amplitude less than the particular value and wherein the first means provide selective ones of the first, second and third operations of the control means in accordance with variations of the voltage on the output side of the line from the controlled value and wherein the second means introduce to the input side of the line a compensating voltage of a particular amplitude and a first polarity in the first operation of the control means, a compensating voltage of the particular amplitude and a second polarity opposite to the first polarity in the second operation of the control means and a compensating voltage of an amplitude less than the particular amplitude and of a particular one of the first and second polarities in accordance with variations in the third operation of the control means.

7. In a voltage regulator wherein a voltage at the output side of a line is to be regulated upon variations of the voltage at the input side of the line from a reference value, the combination comprising:

a first transformer having magnetically loosely coupled primary and secondary windings;

a second transformer having a high-permeability type coupling between its primary and secondary windings;

means for connecting said primary windings in series with said line;

a pair of potentiometers each connected across an individual one of said secondary windings of said first and second transformers and each having a tap;

means for deriving a voltage from said line in relation to said reference value;

means connecting said deriving means in series with taps in the pair of potentiometers to form a composite voltage; and voltage control means connected to said line to operate in response to said composite voltage to regulate the voltage in the line.

8. In a voltage regulator wherein a voltage at the output side of a line is to be regulated upon variations of the voltage at the input side of the line from a reference value, the combination comprising:

a plurality of transformers, each having a secondary winding connected in series between a line input terminal and a line output terminal;

an A.C. control stage for each transformer connected to the primary winding of the transformer and having two D.C. input control lines which, when energized, control amplitude and phase of the transformer voltage in relation to the line voltage;

a D.C. control stage connected to each of said A.C. control stages through the two D.C. input lines thereof for governing the current in said D.C. input lines;

a first transformer having magnetically loosely coupled primary and secondary windings;

a second transformer having a high-permeability type coupling between its primary and secondary windings;

means for connecting said primary windings in series with said line;

a pair of potentiometers each connected across an individual one of said secondary windings of said first and second transformers and having a tap;

means for deriving a voltage from said line in relation to said reference value;

means connecting said deriving means in series with the potentiometer taps to form a composite voltage; and means for feeding said composite voltage to each of said D.C. control stages.

9. In a voltage regulator wherein a voltage at the output side of a line is to be regulated upon variations of the voltage at the input side of the line from a reference value, the combination comprising:

a transformer having primary and secondary windings, said secondary winding being inserted in said line;

a first and a second control winding connected between said line and one side of said transformer primary winding;

a third and a fourth control winding connected between said reference line and the other side of said primary winding, said first and third control windings and said second and fourth control windings being mounted on saturable reactor cores respectively, there being a D.C. control winding on each core, said D.C. control windings being connected in series;

a first transformer having magnetically loosely coupled primary and secondary windings;

a second transformer having a high-permeability type coupling between its primary and secondary windings;

means for connecting said primary windings in series with said line;

a pair of potentiometers, each connected across an individual one of said secondary windings of said first and second transformers and having a tap;

means for deriving a voltage from said line in relation to said reference value;

means for connecting said deriving means in series with the potentiometer taps to form a composite voltage; and means for controlling the current in said D.C. control windings in response to said composite voltage.

10. In a voltage regulator wherein the voltage at the output side of a line is to be regulated upon variations of the voltage at the input side of the line in relation to a reference line voltage, the combination comprising:

a transformer having primary and secondary windings, said secondary winding being inserted in said line;

a first and a second control winding connected between said line and one side of said transformer primary winding;

a third and a fourth control winding connected between said reference line and the other side of said primary winding, said first and third control windings and said second and fourth control windings being mounted on saturable reactor cores respectively, there being a D.C. control winding on each core, said D.C. control windings being connected in series;

a plurality of diodes connected in series at similarly oriented polarity, there being a common input terminal at one end of said series connection;

an additional diode connected in series to less than all of said diodes and in a similar direction of conduction;

a transistor having its base electrode connected to said additional diode;

means for normally applying a biasing voltage to the emitter of said transistor for cutoff thereof;

means for applying a variable voltage to said common input terminal for overriding said transmitter cutoff within a limited range of voltage variation; and means connected to the output side of said line and to said applying means for furnishing said variable voltage as representation of the voltage at the output side of said line.

11. In combination for controlling a voltage at the output side of a line in accordance with variations of the voltage at the input side of the line:

a plurality of control members connected in a circuit relationship and having properties of producing a voltage drop of a particular amplitude across each of the control members from an input value to provide cumulative voltage drops across progressive ones of the control members in the plurality from the input value;

first means coupled to the output side of the line and to the control members for introducing to the control members a voltage having characteristics dependent upon the variations in the voltage on the output side from a controlled value to provide the input value of the voltage to the control members in the plurality;

second means for providing a reference voltage;

a plurality of third means each coupled to the second means and an individual one of the control members in the plurality for comparing the voltage from the individual one of the control members with the reference voltage to provide a control voltage having characteristics dependent upon the results of the comparison;

a plurality of fourth means each responsive to the control voltage from an individual one of the third means in the plurality for selectively producing, in accordance with the characteristics of the control voltage, a particular one of first, second and third voltage increments where the first voltage increment has a particular amplitude and is additive with the voltage at the input side of the line, the second voltage increment has the particular amplitude and is subtractive from the voltage at the input side of the line and the third voltage increment has an amplitude less than the particular amplitude and is variable between characteristics additive to or subtractive from the voltage at the input side of the line; and a plurality of fifth means each operatively coupled to an individual one of the fourth means in the plurality and to the input side of the line for introducing to the input side of the line the particular one of the first, second and third voltage increments produced by the individual ones of the fourth means.

12. In combination for controlling a voltage at the output side of a line in accordance with variations of the voltage at the input side of the line:

a plurality of control members connected in a series reltaionship, each of the control members having properties of producing a particular voltage drop across the control member to provide progressive voltage drops across successive ones of the control members in the series realtionship, there being a common input terminal at one end of the series connections of the control members;

first means coupled to the output side of the line for producing a control voltage having characteristics dependent upon the variations in the voltage from the particular value;

second means coupled to the first means and to the input terminal for introducing the control voltage to the input terminal;

a plurality of differential amplifiers each having first and second output terminals and each having first and second input terminals, each of the differential amplifiers having a first state of operation to produce through the first output terminal a flow of current representing a positive voltage increment of a particular magnitude and having a second state of operation to produce through the second output terminal a flow of current representing a negative voltage increment of the particular magnitude and having a third state of operation to produce through the first and second output terminals flows of current less than the particular magnitude and having relative magnitudes to represent a resultant voltage of a polarity and magnitude dependent upon their relative magnitudes, means connecting the first input terminal of each of the differential amplifiers in the plurality to an individual one of said control members;

means for providing a reference voltage;

means connecting the reference voltage means to the other one of said input terminals in each of said differential amplifiers to obtain the operation of the differential amplifier in a particular one of its first, second and third states in accordance with any differences between the reference voltage and the voltage from the associated one of the control members; and means coupled to the output terminals of each of the differential amplifiers in the plurality and to the input side of the line for introducing to the input side of the line a voltage having a positive polarity and the particular magnitude upon the operation of the differential amplifier in the first state, having a negative polarity and the particular magnitude upon the operation of the differential amplifier in the second state and having a polarity and a magnitude, upon the operation of the amplifier in the third state, dependent upon the relative flows of current through the first and second output terminals of the differential amplifier.

13. In combination for controlling a voltage at the output side of a line in accordance with variations of the voltage at the input side of the line:

a plurality of switching means, each having first and second states of operation and constructed to selectively and individually introduce into the input side of said line additive and subtractive voltage increments of a particular amplitude in the first and second states of operation, respectively, of the switching means;

means for providing a reference voltage;

means responsive to the voltage at the output side of the line for producing a control voltage representative of the voltage at the output side of the line;

means responsive to said control voltage for producing a plurality of voltage components each having a progressive change in value from the control voltage;

a plurality of control stages each responsive to an individual one of the voltage components and the reference voltage and operatively coupled to an individual one of the switching means in the plurality for providing a controlled operation of the associated switching means in the plurality in a particular one of the first and second states in accordance with the relative values of the voltage component and the reference voltage; and a plurality of means each operatively coupled to an individual one of the switching means in the plurality for introducing the additive voltage increment into the line upon an operation of the switching means in the first state and for introducing the subtractive voltage increment into the line upon an operation of the switching means in the second state.

14. In combination for controlling a voltage at the output side of a line in accordance with variations of the voltage at the input side of the line:

first means for providing a first voltage having an amplitude dependent upon the variations in the voltage from the particular value at the output side of the line;

second means for providing a reference voltage;

third means operatively connected to the first and second means and responsive to the first voltage and the reference voltage for comparing the first and reference voltages to produce a control voltage having characteristics dependent upon the results of the comparison;

non-linear switching means having a first state of operation providing a low impedance and providing a first polarization, a second state of operation providing a low impedance and providing a second polarization opposite to the first polarization and a third state providing a variably high impedance and providing selective ones of the first and second polarizations;

fourth means operatively connected to the non-linear switching means and the third means for producing a selective one of the first, second and third states in the non-linear switching means in accordance with the characteristics of the control voltage; and fifth means operatively connected to the fourth means and the input side of the line for introducing to the input side of the line a voltage increment having a positive polarity and a particular amplitude upon the production of the first state in the switching means, a voltage increment having a negative polarity and the particular amplitude upon the production of the second state in the switching means and a voltage increment having selective ones of the positive and negative polarities and an amplitude less than the particular amplitude in accordance with the production of the third state in the switching means.

15. In combination for controlling a voltage at the output side of a line in accordance with variations in the voltage at the input side of the line:

switching means having first and second saturable states to obtain a selective and individual introduction into the input side of said line in-phase and out-of-phase voltage increments of a particular amplitude and having a third state of operation representing a lack of saturation to introduce into the line in-phase and out-of-phase voltage increments of an amplitude less than the particular amplitude in accordance with variations in the operation of the switching means in the third state;

means for providing a reference voltage;

means responsive to the reference voltage and to the voltage at the output side of the line for comparing the reference voltage and the voltage at the output side of the line to produce an error voltage having a polarity and an amplitude dependent upon the difference between the reference voltage and the voltage at the output side of the line;

means responsive to the error voltage and operatively coupled to the switching means for obtaining the operation of the switching means in the first state upon the production of the error voltage with a first polarity and with at least a particular magnitude, in the second state upon the production of the error voltage with a second polarity and with at least the particular magnitude and in the third state upon the production of the error voltage with a magnitude less than the particular magnitude; and means operatively coupled to the switching means for introducing into the line the in-phase component of the particular amplitude upon the operation of the switching means in the first state, the out-of-phase component of the particular amplitude upon the operation of the switching means in the second state and a component having a variable in-phase and out-of-phase relationship in accordance with variations in the operation of the switching means in the third state.

16. In combination for controlling a voltage at the output side of a line in accordance with variations of the voltage at the input side of the line:

a plurality of switching means each having a first state of operation for obtaining the introduction into the input side of the line of a voltage increment of a particular amplitude and a first polarity and having a second state of operation for obtaining the introduction into the input side of the line of the voltage increment of the particular amplitude and of a second polarity opposite to the first polarity and having a third state for introducing to the input side of the line a voltage selectively having one of the first and second polarities and an amplitude less than the particular amplitude in accordance with variations in the operation of the switching means in the third state;

means for providing a reference voltage;

means responsive to the output voltage on the line for producing a plurality of control voltages each representing a progressive change in value from the output voltage;

a plurality of control means each responsive to the reference voltage and an individual one of the control voltages in the plurality for deriving an error signal having particular characteristics representing variations of a particular magnitude in such control voltage from the reference voltage and having particular ones of first and second polarities in accordance with the polarity of the error signal, a particular one of the control means in the plurality being responsive to the reference voltage and an individual one of the control voltages for deriving an error signal having variable characteristics representing variations, less than the particular magnitude, in such control voltage from the reference voltage and having particular ones of first and second polarities in accordance with the polarity of such error signal;

a plurality of means responsive to the error signals from said control means in said plurality for obtaining an operation of all but a particular one of said switching means in the first and second states in accordance with the characteristics of the error signals from the associated ones of the control means in the plurality and for providing a controlled operation of the particular one of the switching means in the third state in accordance with the characteristics of the error signal from the associated one of the control means in the plurality; and means operatively coupled to the switching means in the plurality and to the line for introducing a voltage increment of the first polarity and the particular amplitude into the line for each switching means in the first state, for introducing into the line the voltage increment of the particular amplitude and the second polarity for each switching means in the second state and for introducing into the line a voltage increment of one of the first and second polarities and of an amplitude less than the particular amplitude in accordance with the operation of the particular one of the switching means in the third state.

17. In combination for controlling a voltage at the output side of a line in accordance with variations of the voltage at the input side of the line:

a plurality of switching means each having a first saturable state of operation for obtaining the introduction into the input side of the line of a voltage increment of a particular amplitude and a first polarity and each having a second saturable state of operation for obtaining the introduction into the input side of the line of a voltage increment of the particular amplitude and a second polarity opposite to the first polarity and each having a third unsaturated state for obtaining the introduction into the line of voltages variable in amplitude through ranges less than the particular amplitude and variable between the first and second polarities in accordance with variations in the operation of the switching means in the third state;

first control means responsive to the voltage at the output side of the line for providing a first voltage representing the variations in the voltage at the output side of the line from a controlled value;

a plurality of second control means each operatively coupled to one another and the first control means for producing a plurality of control voltages representing progressive changes from the first voltage;

means for providing a reference voltage;

a plurality of third control means each operatively coupled to the reference voltage means and to the second control means and each having first and second states of operation for comparing the reference voltage and an individual one of the progressive changes in the first voltage to provide a selective one of the first state, the second state and a simultaneous combination of the first and second states in the control means in accordance with the results of the comparison;

a plurality of fourth control means each operatively coupled to an individual one of the switching means in the plurality and an individual one of the third control means in the plurality for obtaining an operation of the switching means in a particular one of the first, second and third states in accordance with the respective operation of the associated one of the third control means in the selective one of the first state, the second state and the simultaneous combination of the first and second states; and means operatively coupled to the switching means in the plurality for introducing the voltage increments of the first polarity and the particular amplitude into the line for switching means in the first state, for introducing the voltage increments of the second polarity and the particular amplitude into the line for switching means in the second state and for introducing into the line voltage increments of one of the first and second polarities and a variable amplitude less than the particular amplitude in accordance with variations in the operation of the switching means in the third state.

References Cited
UNITED STATES PATENTS

| | | | |
|---|---|---|---|
| 2,931,968 | 4/1960 | Hilker | 323—75 |
| 2,931,969 | 4/1960 | Hilker | 323—75 |
| 3,018,431 | 1/1962 | Goldstein | 323—45 |
| 3,036,264 | 5/1962 | Deise | 323—89.12 |
| 3,122,694 | 2/1964 | Muchnick et al. | 323—89 X |
| 3,199,020 | 8/1965 | Hilker | 323—89 |

JOHN F. COUCH, *Primary Examiner.*

A. D. PELLINEN, *Assistant Examiner.*